United States Patent [19]

Humpert et al.

[11] Patent Number: 5,213,377
[45] Date of Patent: May 25, 1993

[54] COUPLING FOR SEATING A TUBE END IN A FITTING

[75] Inventors: Jürgen Humpert, Hemer; Max Derr, Iserlohn, both of Fed. Rep. of Germany

[73] Assignee: Friedrich Grohe Armaturenfabrik GMBH & CO., Hemer, Fed. Rep. of Germany

[21] Appl. No.: 749,164

[22] Filed: Aug. 23, 1991

[30] Foreign Application Priority Data

Aug. 24, 1990 [DE] Fed. Rep. of Germany ....... 4026816

[51] Int. Cl.$^5$ ............................................. F16L 17/04
[52] U.S. Cl. .................................. 285/105; 285/421; 403/105
[58] Field of Search ............... 285/322, 323, 307, 258, 285/105, 421; 411/60, 61, 508, 509, 510, 55, 57, 65, 66; 403/105

[56] References Cited

U.S. PATENT DOCUMENTS

| 1,429,299 | 9/1922 | Pleister | 411/65 |
| 2,968,851 | 1/1961 | Hardy . | |
| 4,056,037 | 11/1977 | McIntyre | 411/60 |
| 4,610,468 | 9/1986 | Wood | 285/307 |
| 4,968,200 | 11/1990 | Mark | 411/60 X |
| 4,984,945 | 1/1991 | Bergner | 411/60 X |

FOREIGN PATENT DOCUMENTS

| EP91112932 | 6/1991 | European Pat. Off. . |
| 1800604 | 8/1969 | Fed. Rep. of Germany . |
| 6927716 | 11/1969 | Fed. Rep. of Germany . |
| 2853281 | 6/1979 | Fed. Rep. of Germany . |
| 3008962 | 9/1981 | Fed. Rep. of Germany . |
| 3202367 | 10/1982 | Fed. Rep. of Germany . |
| 3322202 | 1/1984 | Fed. Rep. of Germany . |
| 3235059 | 3/1984 | Fed. Rep. of Germany . |
| 8501282 | 7/1986 | Fed. Rep. of Germany . |
| 3811357 | 10/1989 | Fed. Rep. of Germany . |
| 1077599 | 8/1967 | United Kingdom . |
| 2091830 | 8/1982 | United Kingdom . |

Primary Examiner—Dave W. Arola
Attorney, Agent, or Firm—Herbert Dubno; Andrew Wilford

[57] ABSTRACT

A fitting is formed with an outwardly open generally cylindrical bore centered on an axis and having an inner surface of a predetermined inner diameter. A tube end fits axially into the bore and is formed with a radially outwardly open groove, and a partial stiff sleeve of elastically deformable and strong material is engaged in the groove and has a frustoconically outwardly flared sharp outer edge of a predetermined outer diameter. Interengaging formations on the sleeve and on the tube end spread the sleeve and force the edge to bite into the inner surface of the bore on axial outward displacement of the sleeve and tube end. An elastomeric seal ring on the tube end offset from the groove radially outwardly engages the bore.

10 Claims, 4 Drawing Sheets

COUPLING FOR SEATING A TUBE END IN A FITTING

FIELD OF THE INVENTION

The present invention relates to a coupling for seating a tube end in a fitting. More particularly this invention concerns an end assembly for plug-in connection of a tube end into a hole in a fitting.

BACKGROUND OF THE INVENTION

In the oldest prior-art systems a feed pipe for a faucet fitting or the like has a threaded end that is covered with dope and threaded tightly into a complementarily threaded bore of the fitting. Such construction requires that threads be formed both in the bore and on the pipe. This is clearly expensive and, if done on the site, time consuming.

Alternately it is known from German patent document 1,650,012 to fit an O-ring around an unthreaded pipe end and force this end into the similarly unthreaded bore. The pipe is held in place by a clamping-nut arrangement. Such a structure is also fairly expensive and complicated, and takes up valuable space, in particular on a fitting adapted to be mounted over a single hole.

German patent document 3,811,357 proposes a structurally simple solution where the tube end is made to an outside diameter that is virtually identical to if not slightly greater than the inside diameter of the bore. The tube end is chilled to shrink it and/or the fitting is heated to expand the bore diameter, and the two are fitted together and cooled, creating a very strong and simple press fit. It is virtually impossible to make such a joint in the field, however, and even at the factory the chilling and/or heating equipment is expensive to run and use.

OBJECTS OF THE INVENTION

It is therefore an object of the present invention to provide an improved coupling or joint assembly for securing a pipe end in a fitting.

Another object is the provision of such an improved coupling or joint assembly for securing a pipe end in a fitting which overcomes the above-given disadvantages, that is which is simple and cheap, and that allows easy assembly in the field.

SUMMARY OF THE INVENTION

The instant invention is a fitting formed with an outwardly open generally cylindrical bore centered on an axis and having an inner surface of a predetermined inner diameter, a tube end fittable axially into the bore and formed with a radially outwardly open groove, and a partial stiff sleeve of elastically deformable and strong material engaged in the groove and having a frustoconically outwardly flared sharp outer edge of a predetermined outer diameter. Interengaging formations on the sleeve and on the tube end spread the sleeve and force the edge to bite into the inner surface of the bore on axial outward displacement of the sleeve and tube end. An elastomeric seal ring on the tube end offset from the groove radially outwardly engages the bore.

Thus with this system the pipe end fitted with the sleeve and the seal ring is simply pushed into the bore to form the seal and lock it in place. Subsequent withdrawal is impossible. This is a one-way coupling so that once the two parts are joined they can only be separated by destroying one of them.

According to this invention the sleeve has a pair of separate radially confronting U-section parts and is provided with an elastomeric ring retaining the parts radially against the tube at the groove. Alternately the sleeve is formed as one piece with an axially throughgoing split. Furthermore the sleeve has a generally cylindrical inner portion and a frustoconically outwardly flared outer portion forming the edge. An elastomeric ring is engaged in the groove under the outer portion of the sleeve to push the flared portion and locking edge outward. The tube end is formed axially inward of the groove with an inner groove in which the seal ring is seated.

Further according to the invention the groove has a floor formed with an outwardly tapered and generally frustoconical inner surface portion forming one of the formations. In addition the groove has axially inner and outer annular end flanks substantially perpendicular to the axis, a cylindrical outer end portion extending axially inward from the outer end flank and centered on the axis, and an outwardly tapered frustoconical inner end portion extending axially inward from the outer end portion to the inner end flank. The sleeve in turn is axially shorter than the axial distance between the end flanks. Thus when installed the sleeve will simply sit down in the groove, but when fluid pressure or something else pushes the tube axially outward, the sleeve will ride up on the tapered inner floor portion and will be spread to tightly lock the tube in the bore.

In accordance with further features of this invention the tube end is the end of a copper pipe and is of generally uniform wall thickness at and adjacent the groove. The sleeve is made of steel.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
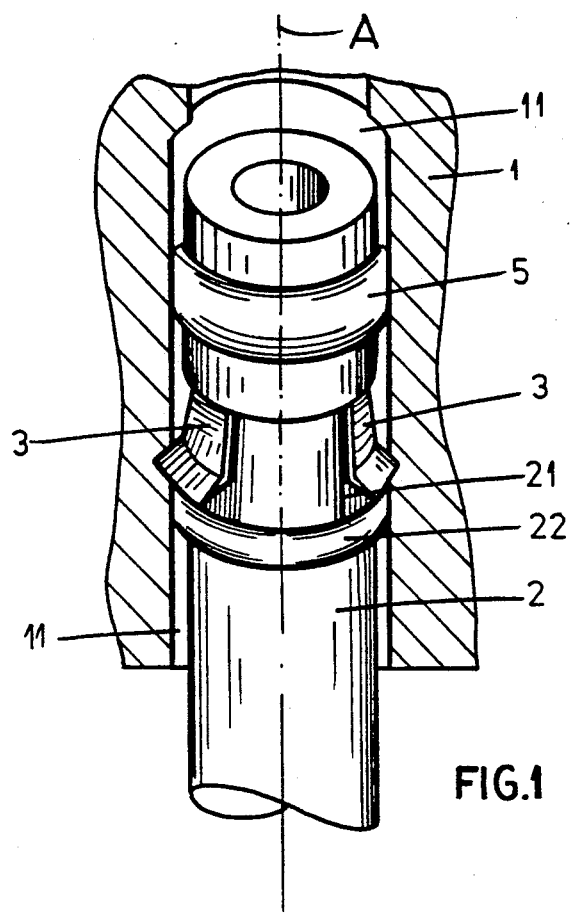
FIG. 1 is a perspective view partly in axial section through the joint assembly according to this invention.
Figure 2:
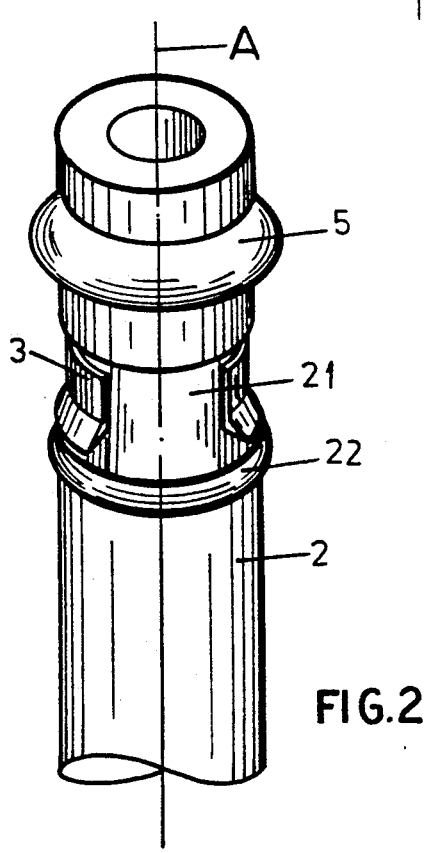
FIG. 2 is a perspective view of the tube-end parts of the assembly of FIG. 1.

As seen in FIGS. 1, 2, 4, and 5 a joint or coupling assembly according to this invention comprises a fitting 1 formed with a cylindrical outwardly open bore 11 centered on an axis A and a tube end 2 of an outer diameter that is slightly less than the inner diameter of the bore 11. This tube end 2 is formed with a square-section outwardly open inner groove 23 in which is fitted an elastomeric O-ring 5 of a diameter greater than the radial depth of the groove 23 so that when the tube end 2 is inserted in the bore 11 this ring 5 is compressed to form a watertight seal with the bore 11. The fitting 1 is typically made of a metal like brass.

Outward from the groove 23 the tube end 2 is formed with another radially outwardly open groove 21 having annular outer and inner flank surfaces 212 and 213 both perpendicular to the axis A, and a floor formed by an outer cylindrical portion 211 centered on the axis A and an inner frustoconical portion 210 that tapers outward. Thus the radial dimension of the inner flank surface 213 is less than that of the outer flank surface 212 due to the taper of the surface 210. The tube end 2 is normally made of copper or brass.

A partial sleeve or collar 3, that is a sleeve or collar that is not annularly continuous but that is split, is received in the groove 21. This sleeve 3 has a cylindrical inner portion 32 of an outside diameter that is at most equal to the outside diameter of the tube end 2 or of the inside diameter of the bore 11 and a frustoconically outwardly flared outer portion or skirt 33 that is of outwardly decreasing wall thickness so that it terminates at its outer end in a sharp edge 31 of a diameter equal to more than the inside diameter than the bore 11. The sleeve 3 has an inner end 35 that lies in a plane perpendicular to the axis A and that when fully installed abuts the surface 213 of the groove 21. This sleeve 3 is made of an elastically springy but strong metal like stainless steel that is harder than the metal forming the fitting 1. The sleeve 3 is furthermore formed with a split 34 that is big enough that, taking into account the elasticity of the material of which the sleeve 3 is formed, it can be spread to snap the sleeve 3 over the tube end 2 at the groove 21. In addition the overall axial length of the sleeve 3 is at most equal to the distance between the outer small-diameter end of the frustoconical surface 210 and the surface 212.

The groove 21 holds at its outer end 212 an elastomeric ring 22 that normally lies underneath the skirt 33 of the sleeve 3.

For installation of the tube end 2 in the bore 11 first the rings 5 and 22 are fitted to the respective groove 23 and 21. Then the sleeve 3 is spread and fitted over the end 2 at the groove 2 above, that is inward of, the ring 22. The thus equipped tube end 2 is then forced axially into the bore 11. This action radially compresses the ring and also radially compresses the sleeve 3 whose edge 31 will ride along the inner surface of the bore.

Once thus installed the ring 5 will effectively seal between the tube end 2 and bore 11. The ring 22 and the inherent springiness of the sleeve 3 will push the edge 31 into tight radial engagement with the bore inner surface. Subsequent pressurization of the fitting 1 will urge the tube end 2 axially outward, that is down in the drawing, which will cause the sleeve 3 to ride inwardly up on the surface 210, thereby radially spreading this sleeve 3. The edge 31 will bite into the inner surface of the bore 11, preventing the sleeve 3 from sliding axially outward until the sleeve inner end 35 abuts the surface 213 thereby blocking any further outward movement of the tube end 2. The joint is therefore physically strong and leak tight. At the same time it is put together in a very quick and easy manner.

Figure 3:
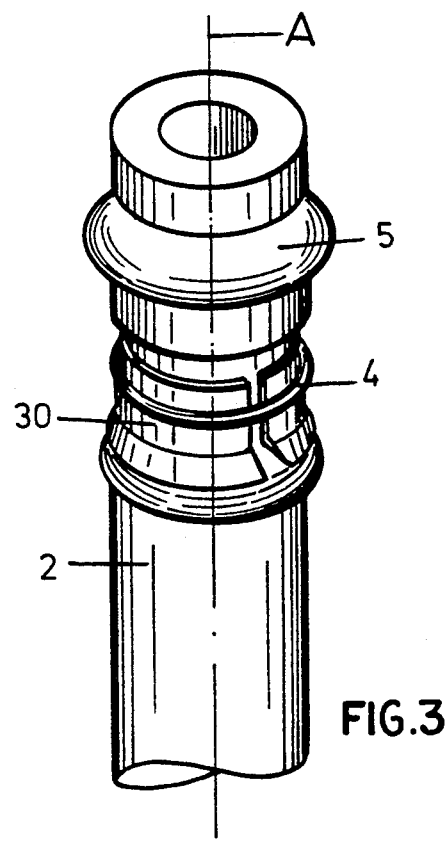
FIG. 3 is a view like FIG. 2 of a variant on the inventive system.
Figure 4:
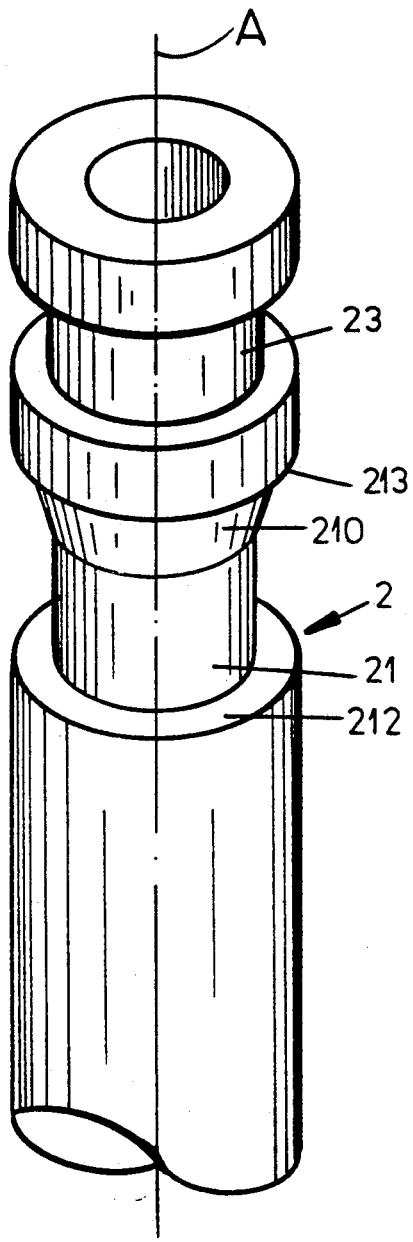
FIG. 4 is a larger-scale view like FIG. 2 of the tube end all alone.
Figure 5:
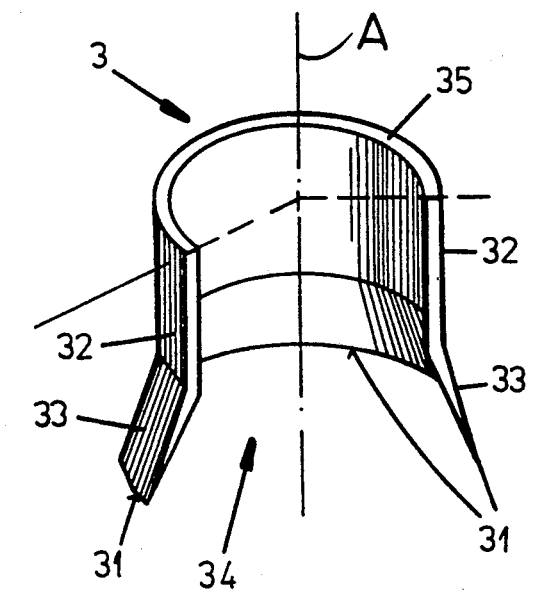
FIG. 5 is a large-scale perspective view of the locking sleeve according to the invention used in the FIG. 2 embodiment.
Figure 6:
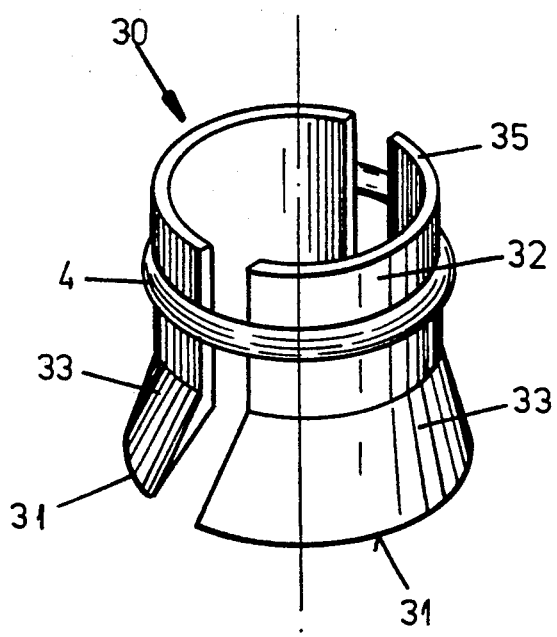
FIG. 6 is a view like FIG. 3 of the FIG. 5 sleeve.
Figure 7:
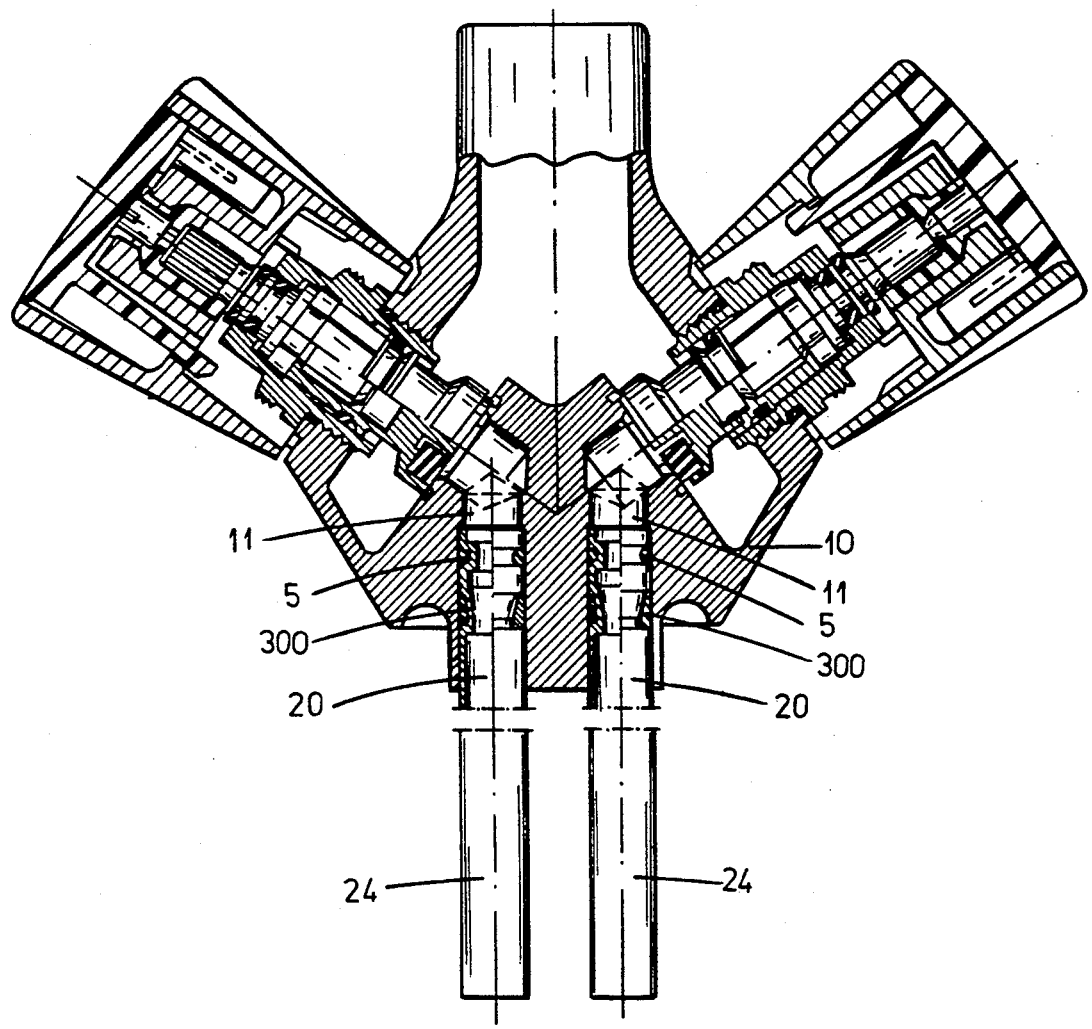
FIG. 7 is a small-scale vertical section through a faucet assembly according to the invention that is a slight variant on the assembly of FIG. 1.
Figure 8:
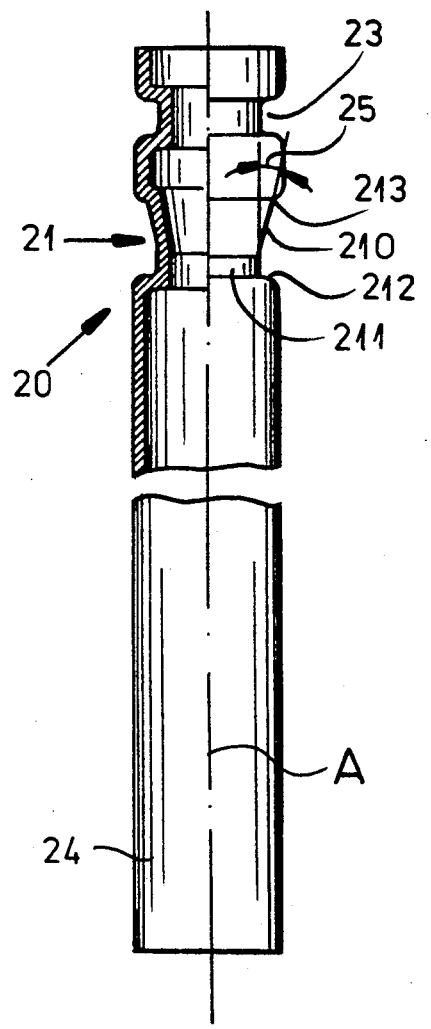
FIG. 8 is a side view partly in axial section through one of the tube ends of FIG. 7.
Figure 9:
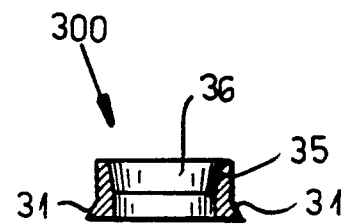
FIG. 9 is an axial section through the locking sleeve of FIG. 7.
Figure 10:
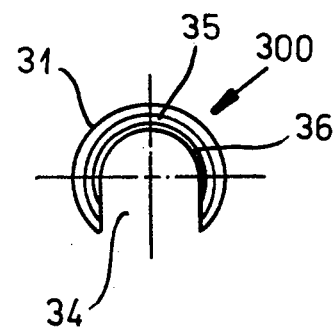
FIG. 10 is a top view of the locking sleeve of FIG. 7.

FIGS. 3 and 6 show a variant on the system of this invention where the sleeve 3 is replaced by a two-part sleeve 30 that is formed of two separate parts that each extend angularly relative to the axis A through slightly less than 180°. These two sleeve parts are held together by an elastomeric ring 4 engaged about their cylindrical portions 32. This embodiment functions identically to that of FIGS. 1, 2, 4, and 5, except that it does not have to be spread to be fitted over the tube end 2.

FIGS. 7 through 10 show an arrangement wherein tube ends 20 that are formed on the ends of water supply lines 24 and that are externally identical to the tube ends 2 of FIG. 1 through 6 are used. These tube ends 20 are formed of thin-wall copper and are of uniform wall thickness so that their inner surfaces mirror their outer surfaces. Here as in FIGS. 1 through 6 the frustoconical portion 210 of the groove 21 flares at an angle 25 of about 10°. In addition the tube end 20 has a diameter of about 10 mm.

In this embodiment also a locking sleeve 300 is used whose split 34 is of a width equal to the diameter of the tube end 20 at the groove 21. In addition the outer surface of this sleeve 300 is basically cylindrical and of a diameter equal to slightly less than the inside diameter of the bore 11, and the edge 31 is formed as a V-section outwardly directed ridge of a maximum diameter generally equal to the inside diameter of the bore 11. Furthermore the inner surface of the sleeve 300 has a cylindrical outer portion of an inside diameter equal to the outside diameter of the groove portion 211 and a frustoconical inner portion complementary to the outer half or third of the frustoconical groove portion 210.

With this arrangement therefore the tube end 20 can be forced up into the bore 11 of the fitting 10 which has hot- and cold-water inlets. As it is being slipped in the edge 31 scrapes slightly on the wall of the bore 11, but not enough to impede full insertion since the sleeve 300 will be sitting solidly on the surface 212.

Once fully inserted any axial outward pressure will cause the sleeve 300 to slip up on the surface 210 which will cause it to spread radially. This action will cause the edge 31 to dig even more deeply into the wall of the bore 11, thereby solidly locking the tube end 20 in place.

Such an arrangement is particularly effective on a faucet set that is to be mounted through a single hole in the deck. Instead of providing the installer with the fixture with two flexible feed lines that have to be painstakingly threaded through the single hole, instead the feed stub can simply be fitted through the hole and the basic mounting completed. Then the supply lines are pushed up into the bores, completing the assembly.

We claim:
1. In combination:
   a fitting formed with an outwardly open generally cylindrical bore centered on an axis and having an inner surface of a predetermined inner diameter;
   a tube end fittable axially into the bore and formed with a radially outwardly open groove having a frustoconically tapered and radially outwardly directed inner surface portion of a diameter decreasing axially outwardly;
   a split stiff sleeve of elastically deformable and strong material engaged in the groove and having a prede- termined inside diameter and a frustoconically outwardly flared sharp outer edge of a predetermined outer diameter, the diameters of the sleeve being such relative to the diameter of said inner surface portion and said inner surface that, on axial displacement of the sleeve onto the tapered inner surface portion by relative movement between said fitting and tube end, the sleeve is spread and its sharp edge bites into the inner surface of the bore thereby preventing continuation of said relative movement; and an elastomeric seal ring on the tube end offset from the groove and sealingly engaging the bore and tube end.

2. The combination defined in claim 1 wherein the sleeve has a pair of separate radially confronting U-section parts and is provided with an elastomeric ring retaining the parts radially against the tube at the groove.

3. The combination defined in claim 1 wherein the sleeve has generally cylindrical inner portion.

4. The combination defined in claim 3 wherein the sleeve is formed as one piece with an axially throughgoing split.

5. The combination defined in claim 3, further comprising an additional groove formed in said tube end under the outwardly flared of the sleeve and an elastomeric ring in said additional groove.

6. The combination defined in claim 1 wherein the tube end is formed axially inward of the groove with an inner groove in which the seal ring is seated.

7. The combination defined in claim 1 wherein the tube end is the end of a copper pipe.

8. The combination defined in claim 7 wherein the tube is of generally uniform wall thickness at and adjacent the groove.

9. The combination defined in claim 1 wherein the sleeve is made of steel.

10. In combination:

a fitting formed with an outwardly open cylindrical bore centered on an axis and having an inner surface of a predetermined inner diameter;

a tube end fittable coaxially into the bore, having an outer diameter slightly smaller than the inner diameter, and formed with a radially outwardly open groove having
  axially spaced inner and outer annular end flanks substantially perpendicular to the axis,
  a cylindrical outer end portion extending axially inward from the outer end flank and centered on the axis, and
  an outwardly tapered frustoconical inner end portion extending axially inward from the outer end portion to the inner end flank;

a sleeve of elastically deformable and strong material harder than the fitting engaged in the groove, having an inside diameter, and having a frustoconically outwardly flared sharp outer edge of a predetermined outer diameter, the sleeve being annularly discontinuous and axially shorter than the axial distance between the end flanks, the outer diameter of the sharp edge and the inner diameter of said inner surface and the sleeve being such that, when the sleeve slides axially onto the tapered inner end portion of the groove by relative movement between said fitting and tube end, the sleeve spreads radially and its sharp edge bites into the inner surface of the fitting bore thereby preventing continuation of said relative movement; and an elastomeric seal ring on the tube end offset from the groove and sealingly engaging the bore and tube end.

* * * * *